United States Patent [19]
Manning et al.

[11] Patent Number: 6,019,521
[45] Date of Patent: Feb. 1, 2000

[54] OPTICAL FIBER CONNECTOR

[75] Inventors: Randy Marshall Manning, New Cumberland; James David Kevern, Wellsville, both of Pa.

[73] Assignee: The Whitaker Corporation, Wilmington, Del.

[21] Appl. No.: 09/021,039

[22] Filed: Feb. 9, 1998

[51] Int. Cl.[7] .................................................. G02B 6/36
[52] U.S. Cl. .............................. 385/77; 385/76; 385/56; 385/81
[58] Field of Search .................................. 385/77, 76, 78, 385/55, 56, 60, 81, 84–89, 92, 139

[56] References Cited

U.S. PATENT DOCUMENTS

| | | | |
|---|---|---|---|
| 4,602,831 | 7/1986 | Lockard | 339/14 R |
| 5,219,300 | 6/1993 | Yagi et al. | 439/532 |
| 5,254,014 | 10/1993 | Yagi et al. | 439/357 |
| 5,481,634 | 1/1996 | Anderson et al. | 385/76 |
| 5,496,190 | 3/1996 | Ittah et al. | 439/354 |
| 5,498,171 | 3/1996 | Semaan | 439/352 |
| 5,562,475 | 10/1996 | Kern, Jr. et al. | 439/344 |

*Primary Examiner*—Phan T. H. Palmer

[57] ABSTRACT

Disclosed is a connector which can be used to terminate, among other things, an optical fiber. The connector includes a housing, and the housing defines a cavity. The housing has an end configured for insertion into an associated receptacle. On the housing is a latch for securing the housing in the associated receptacle. The latch has a first end and a second end opposite the first end, and each end of the latch is either connected to or simply supported by the housing.

18 Claims, 5 Drawing Sheets

OPTICAL FIBER CONNECTOR

The present invention relates generally to connectors for use with optical fibers, and more specifically relates to a novel connector for use with optical fibers, where the connector includes a latch having each end either connected to a housing or simply supported by the housing.

BACKGROUND OF THE INVENTION

Fiber optic technology presents several advantages which cannot be provided by other technologies. For example, fiber optic communication systems provide immunity from electromagnetic interference (EMI), provide virtually unlimited bandwidth, and provide that data can be quickly transferred over long distances.

Typically, connectors are used within optical fiber communication systems. For example, connectors are used to join optical fibers together to form a longer length, or to connect an optical fiber to a device. Generally, an optical fiber connector must provide that the end of one optical fiber becomes axially aligned with the end of another optical fiber. As a result, after the connection is made, all of the light from one optical fiber can travel into the other optical fiber. Because optical fibers are extremely small and because it is important that no data be lost at the point at which two optical fibers are joined, it is important that an optical fiber connector be able to join two optical fibers with a relatively high amount of accuracy and precision.

Fiber optic connectors are often used in environments where there are many loose and/or hanging wires, such as copper conductor wires or other optical fibers. Examples of such environments include a patch panel, a patch enclosure and an electrical closet. Within environments such as these, it is advantageous to provide a connector which is not prone to entanglement on the wires. Tanglement with wires during connection or disconnection of a connector can provide that the wires become damaged or some portion of the connector becomes damaged.

Fiber optic connectors are also often used in high-traffic environments, such as on a desktop. Using a connector to connect optical fibers within a high-traffic environment requires that the connector be durable enough to withstand the environment.

Of course, it is also desirable to provide an optical fiber connector where the connector includes as few parts as possible and is relatively inexpensive to produce. Unfortunately, some SC connectors are comprised of as many as forty-five individual parts.

U.S. Pat. No. 5,481,634 is among the prior art, and discloses a connector comprised of relatively few parts and is presumably relatively inexpensive to provide. However, the connector disclosed therein also provides some disadvantages which are addressed by the present invention.

The connector disclosed in the '634 patent includes a latch member which facilitates connection of a housing to an associated receptacle. The latch is essentially a rearward-facing cantilever beam. In other words, the front end of the latch is connected to a front, entry-end portion of a housing, and the latch extends rearward on the housing such that the rearward end of the latch is suspended and spaced-apart from the housing. Because the rearward end of the latch is spaced-apart from the housing, the latch is prone to entanglement with wires upon engagement or disengagement of the connector with the associated receptacle. Therefore, the connector disclosed in the '634 patent is not ideal for use in environments where there are many loose and/or hanging wires such as which can be found on a patch panel, in a patch enclosure or in an electrical closet.

Additionally, the connector disclosed in the '634 patent is not ideal for use in high-traffic environments, such as on a desktop. The fact that the rearward end of the latch of the connector is suspended and spaced-apart from the housing provides that the latch is prone to being accidentally and periodically forced away from the housing in a direction opposite to that for which the latch was specifically designed. Hence, in high-traffic environments, the latch of the connector disclosed in the '634 patent may break off the housing or become ineffective due to the repeated flexing away from the housing. Therefore, the connector will no longer be able to be used to effectively terminate an optical fiber.

Still other disadvantages presented by the connector disclosed in the '634 are specifically addressed by the present invention.

Many of the problems discussed hereinabove with respect to optical fiber connectors are also applicable to connectors for connecting conductor wires together, such as connecting copper conductor wires together. As will become apparent, the present invention may also be embodied as a conductor wire connector.

Generally, the present invention is specifically directed to overcome at least some of the difficulties discussed hereinabove as well as others which should become apparent to one having ordinary skill in the art upon reading the following disclosure.

OBJECTS AND SUMMARY

Accordingly, it is a general object of the present invention to provide a novel connector which can be used to terminate an optical fiber or conductive member, such as a wire, and which is ideal for use in environments where loose and/or hanging wires often can be found, such as on a patch panel, in a patch enclosure or in an electrical closet.

Another object of the present invention is to provide a novel connector which can be used to terminate an optical fiber or conductive wire and which is not prone to entanglement with loose and/or hanging wires during engagement or disengagement of the connector.

Still another object of the present invention is to provide a novel connector which can be used to terminate an optical fiber or conductive wire and which is ideal for use in a high-traffic environment such as on a desktop.

Still yet another object of the present invention is to provide a novel connector which can be used to terminate an optical fiber or conductive wire and which is durable and not prone to breaking during use.

A still further object of the present invention is to provide a novel connector which can readily and easily be used to terminate an optical fiber or conductive wire in the field.

A yet still further object of the present invention is to provide a novel connector which is relatively inexpensive to produce and which consists of relatively few parts.

By the present invention, it is proposed to overcome the at least some of the difficulties which have been encountered heretofore and which have been discussed briefly hereinabove. To this end, the present invention provides a novel connector which can be used to terminate, among other things, an optical fiber. The connector includes a housing, and the housing defines a cavity. The housing has an end configured for insertion into an associated receptacle. On the housing is a latch for securing the housing in the associated receptacle. The latch has a first end and a second end opposite the first end, and each end of the latch is either connected to or simply supported by the housing.

A preferred embodiment of the present invention also provides a novel connector which can be used to terminate, among other things, an optical fiber. The connector includes a housing having an end configured for insertion into an associated receptacle and having a latch for securing the housing in the associated receptacle. The latch has a first end and a second, opposite end, each of which are connected to the housing. The latch includes a flexing portion generally perpendicular to a longitudinal axis of the housing. The latch also includes an actuator portion which is pressable thereon to disengage the housing from the receptacle. The latch further includes catch structure which engages with corresponding catch structure in the associated receptacle causing the housing to become secured therein. The latch also includes a wedge portion which is engageable against corresponding wedging structure in the associated receptacle when the housing is inserted into the associated receptacle. As a result, the latch is urged in a direction generally perpendicular to the longitudinal axis of the housing so that the catch structure on the latch can engage with the corresponding catch structure in the associated receptacle upon the housing being further inserted into the housing. The first end of the latch is adjacent the end of the housing which is configured for insertion into the associated receptacle and defines a key for insertion in a keyway in the associated receptacle.

BRIEF DESCRIPTION OF THE DRAWINGS

The organization and manner of the structure and operation of the invention, together with further objects and advantages thereof, may best be understood by reference to the following description, taken in connection with the accompanying drawings, wherein.

DESCRIPTION OF EMBODIMENTS OF THE INVENTION

Figure 1:
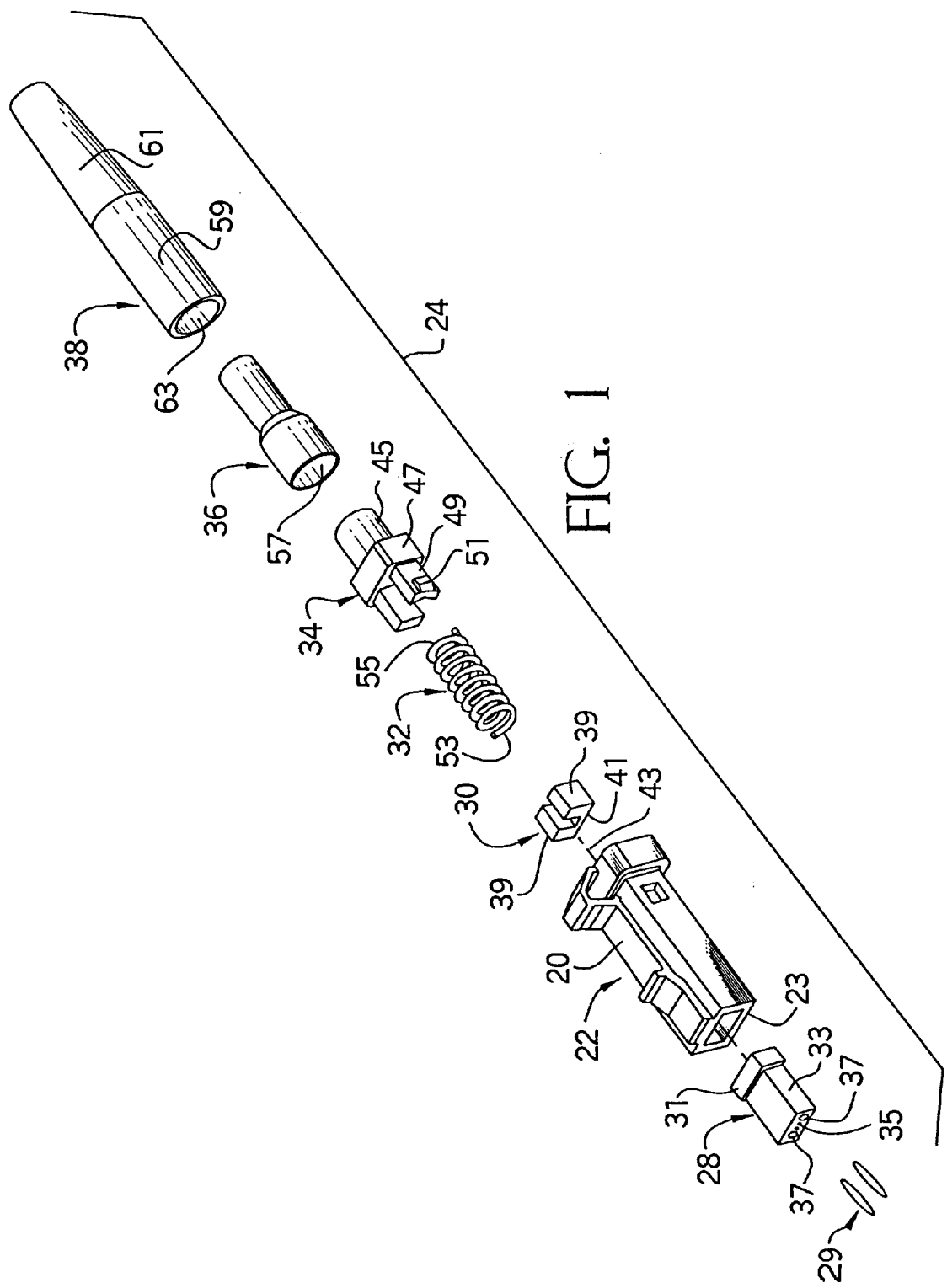
FIG. 1 is an exploded perspective view of a connector including a plug housing in accordance with a first embodiment of the present invention for terminating an optical fiber.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 3:
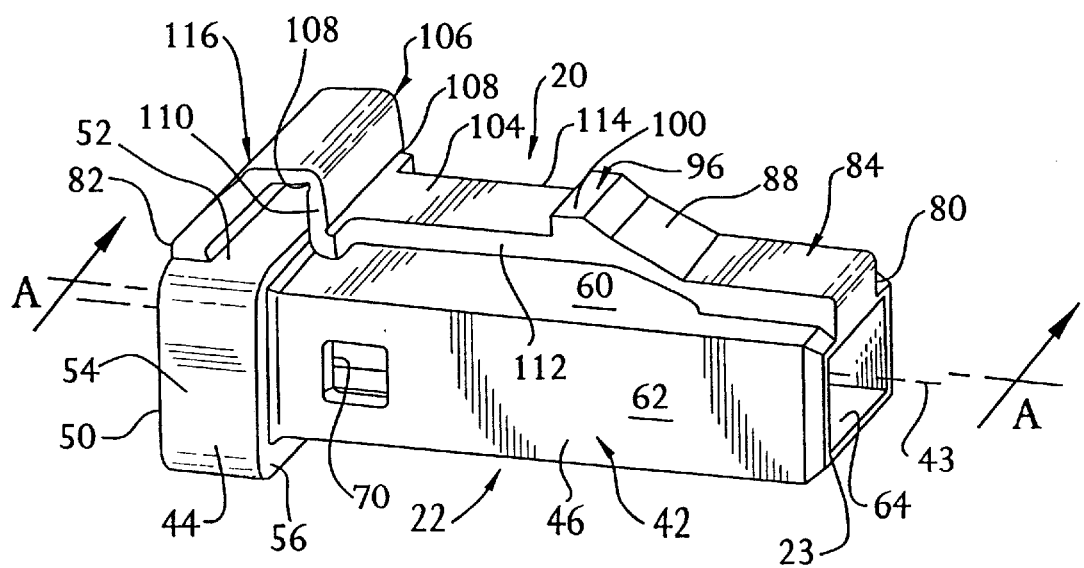
FIG. 3 is a perspective view of the plug housing shown in FIG. 1.

Shown in FIGS. 3, 4, 5, 6 and 7 are plug housings for use in a connector in accordance with the present invention. Specifically, the plug housing 22 shown in FIG. 3 is for use with a novel connector in accordance with a preferred embodiment of the present invention, and the plug housings 22a, 22b 22c and 22d shown in FIGS. 4, 5, 6 and 7, respectively, are for use with connectors in accordance with alternative embodiments of the present invention.

Figure 2:
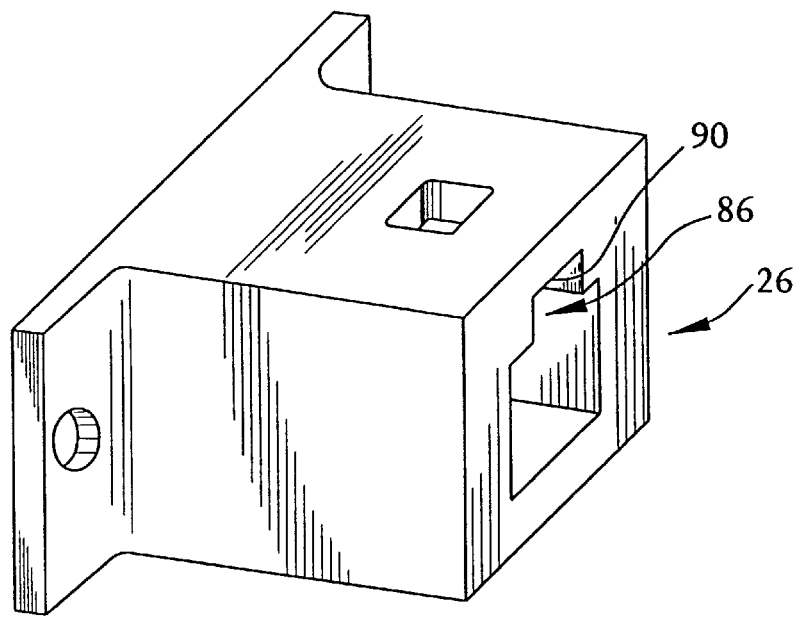
FIG. 2 is a perspective view of a receptacle into which the connection shown in FIG. 1 can be inserted.

Plug housing 22 is configured to be engaged with an associated receptacle such as the receptacle 26 shown in FIG. 2. In contrast, plug housings 22a, 22b 22c and 22d are configured to be engaged with a receptacle which is similar to a standard RJ-type receptacle, but which is dimensionally smaller. Preferably, each of the plug housings 22a, 22b 22c and 22d is utilized within essentially the same connector 24 as that of plug housing 22 which is depicted in FIG. 1. In other words, in utilizing plug housing 22a, for example, it is preferred that plug housing 22a replace plug housing 22 within the overall connector 24 configuration and that the remainder of the components of connector 24 remain the same. Each of the plug housings 22, 22a, 22b 22c and 22d is essentially the same, but includes different latch structure. Because each of the plug housings 22a, 22b 22c and 22d are preferably utilized within the same connector 24 as that of plug housing 22 shown in FIG. 1, the components of the connector 24 will first be described in connection with plug housing 22. Then, only the latches of each of the plug housings 22a, 22b, 22c and 22d will be described referring to FIGS. 3, 3A, 3B, 3C, 4, 5, 6 and 7 with the understanding that it is preferred that each of the plug housings 22a, 22b 22c and 22d be utilized within essentially the same connector 24 as that of plug housing 22. For clarity, when describing the plug housings 22a, 22b 22c and 22d, the other components of the connector 24 will not be again discussed with the understanding that one may review the detailed discussion of connector 24 to obtain an understanding of the components with which the plug housings 22a, 22b 22c and 22d are intended to be utilized. Also for clarity, only the plug housings 22a, 22b 22c and 22d are depicted in FIGS. 3, 3A, 3B, 3C, 4, 5, 6 and 7, and no other components of the connector 24 is depicted.

The components of the connector 24 and overall generalities of plug housing 22 depicted in FIG. 1 will now be described. The plug housing 22 is one component in the connector 24, such connector 24 being mountable in a receptacle 26, such as that which is depicted in FIG. 2. Therefore, an end 23 of the plug housing 22 is configured and shaped for insertion into the receptacle 26. The connector 24 and receptacle 26 are used to terminate a conventional fiber optic cable (not shown). The receptacle 26 may be mounted in or to a member, such as a wall, and may have a like receptacle mounted on the other side of the member for terminating a like fiber optic cable with a like connector 24 such that the ends of the optical fibers in the fiber optic cables can be connected together so that data, in the form of light, can be transmitted. Alternatively, the receptacle 26 may serve as a transceiver interface in which case a like receptacle will not be mounted on the other side of a member such as a wall. It will also be appreciated that the connector 24, which incorporates the novel features of the present invention, can be used to terminate copper wires, however, the description herein describes the connector 24 for use in terminating fiber optic cables.

The fiber optic cable (not shown) which is terminated by the present connector 24 is known in the art. Fiber optic cables may be a pair of thin channels or optic fibers which are formed of glass. The thin glass fibers are typically coated with ultraviolet-curable material for protection. The coated fibers are then covered with a thermoplastic having sufficient stiffness to preclude fiber buckling. Strength yarns or other suitable strength members surround the coated and covered fibers to withstand tensile forces, which can be caused by pulling on the fiber optic cable, which could otherwise break the fibers. Suitable strength yarns may be made of fibrous aramid material. An outer jacket, which may be made of polyvinyl chloride, surrounds the coated and covered fibers and the strength yarns.

The connector 24 includes a plurality of components and in a specific embodiment includes the plug housing 22, a ferrule member 28, guide pins 29, a U-shaped guide pin clip 30, a cylindrical, coiled compression spring 32, a spring push member 34, a crimpable eyelet 36 and a strain relief boot 38. The ferrule member 28 and the guide pin clip 30 are mounted within a forward portion of the plug housing 22 and the ferrule member 28 extends outwardly from a front end of the plug housing 22. The front portion of the spring push member 34 is mounted to a rear portion of the plug housing 22 and the compression spring 32 is mounted within the plug housing 22 between the spring push member 34 and the guide pin clip 30. A rear portion of the spring push member 34 extends outwardly from the rear end of the plug housing 22. A forward portion of the crimpable eyelet 36 is mounted on a rear portion of the spring push member 34 and finally, a forward portion of the strain relief boot 38 overlaps and covers the crimpable eyelet 36. The specifics of the guide pin clip 30, the spring push member 34, the crimpable eyelet 36 and the strain relief boot 38 are known in the art. The crimpable eyelet 36 and the strain relief boot 38 are used to connect the fiber optic cable to the connector 24 in a manner known in the art. As such, each component of the connector 24 is only generally described herein.

Attention is now directed to FIGS. 3, 3A–3C, 4, 5, 6 and 7 for an explanation of the general structure of the plug housings 22, 22a, 22b 22c and 22d. For ease in description, the general structure of the plug housings 22, 22a, 22b 22c and 22d, with the exception of the novel latch structures 20, 20a, 20b, 20c and 20d thereof, is described with respect to the first embodiment of the plug housing 22 shown in FIGS. 1, 3 and 3A–3C with the understanding that the other plug housings 22a, 22b 22c and 22d are the same, except for the differences noted herein.

The plug housing 22 is formed of thermoplastic and includes a base portion 44 integrally formed with a portion 46 which extends therefrom. A longitudinal axis of the housing 22 is identified by reference numeral 43. A first, "forward" end of the plug housing 22 is defined at 23 and a second, opposite "rear" end of the plug housing is defined at 50. The terms "forward" and "rearward" are defined in this manner because the forward end of the plug housing 22 is defined as the end which is first inserted into the receptacle 26.

The base portion 44 has a top wall 52, opposite side walls 54 (only one of which is shown) and a bottom wall 56. The top and bottom walls 52, 56 are spaced apart from each other, and the side walls 54 are spaced apart from each other, to define a rectangular axial passageway 58 through the base portion 44.

The extending portion 46 is generally rectangularly-shaped and has a top wall 60, opposite side walls 62 and a bottom wall 64. The top and bottom walls 60, 64 are spaced apart from each other, and the side walls 62 are spaced apart from each other, to define a rectangular axial passageway 66 through the extending portion 46, such rectangular axial passageway 66 being aligned with the rectangular axial passageway 58 through the base portion 44. A shoulder 68 is formed along a portion of the rectangular axial passageway 66 to define a smaller portion of the extending portion axial passageway 66. An aperture 70 is provided through each of the side walls 62 along a rear portion of the extending portion 46 for receiving a portion of the spring push member 34 component of the connector 24 as will be described later herein.

The top and bottom walls 52, 56 of the base portion 44 are spaced further apart from each other than the top and bottom walls 60, 64 of the extending portion 46 such that the axial passageway 58, while in alignment with the axial passageway 66, is larger than the axial passageway 66. The base portion 44 is formed at the rear end of the plug housing 22 such that the extending portion 46 extends forwardly therefrom.

The ferrule member 28 may, for example, be a MT ferrule which is conventional in the art. The ferrule 28 is mounted within the smaller portion of the extending portion axial passageway 66. The ferrule 28 is formed from glass, plastic, metal or ceramic and has a base portion and a portion which extends forwardly therefrom. A base portion 31 of the ferrule 28 has a top surface, a first side surface, a second side surface and a bottom surface. An extending portion 33 of the ferrule 28 is generally rectangularly-shaped and has a top surface, a first side surface, a second side surface and a bottom surface. The top and bottom surfaces of the base portion are spaced apart from each other further than the top and bottom surfaces of the extending portion are spaced apart from each other, and the side surfaces of the base portion are spaced apart from each other further than the side surfaces of the extending portion are spaced apart from each other. A polished, end surface 35 is provided on the forward end of the ferrule member 28 for abutting against the end surface of another ferrule member in a typical interconnection. A pair of axial outer bores 37 are provided through the ferrule member 28. Such outer bores are respectively proximate to the side walls of the ferrule member 28. A pair of axial, inner bores are provided through the ferrule member 28 at a position between the outer bores 37. The outer bores respectively accept the guide pins 29 therethrough and the guide pins 29 extend outwardly from the forward end of the ferrule member 28. The inner bores respectively accept a channel of the fiber optic cable therethrough. When the ferrule member 28 is mounted within the plug housing 22, the base portion 31 thereof seats within the larger portion of the axial passageway 66 and the extending portion seats within the smaller portion of the axial passageway 66. A front portion of the ferrule member 28, which has the end surface, extends slightly forwardly from the front end 48 of the plug housing 22.

The U-shaped guide pin clip 30 is formed from plastic and includes opposite side walls and a bottom wall which connects the side walls together. The guide pin clip 30 is mounted within the larger portion of the axial passageway 66 through the extending portion 46 and is used to retain the rearward ends of the guide pins 29 in place through the ferrule member 28. When the guide pin clip 30 is mounted within the passageway 66, the side walls 39 of the guide pin clip 30 are proximate to the side walls 62 of the axial passageway 66 and the bottom wall 41 of the guide pin clip 30 is proximate to the bottom wall 64 of the passageway 66. The guide pin clip 30 abuts against the rear end of the ferrule member 28. Of course, the ferrule member 28 may also be provided as a simplex or duplex type ferrule.

The spring push member 34 is formed from plastic and includes a cylindrical portion 45, a rectangular portion 47 integrally formed therewith and a pair of cantilevered arms 49 extending from the rectangular portion 47. The arms 49 are spaced apart from each other, and each arm 49 has a latch member 51 protruding outwardly therefrom which engages with the respective apertures 70 provided through the side walls 62 of the plug housing 22. An aligned axial passageway is formed through the cylindrical portion 45 and the rectangular portion 47 of the spring push member 34. The arms 49 are positioned on the rectangular portion 47 such that the axial passageway is not blocked.

The coiled spring 32 is mounted between the spring push member 34 and the guide pin clip 30. A front end 53 of the spring 32 abuts against the guide pin clip 30 and a rear end 55 of the spring 32 is positioned between the arms 49 of the spring push member 34 and engages against the rectangular portion 47 thereof. To mount the spring push member 34 to the plug housing 22, the arms 49 are pushed into the rear end of the plug housing 22 until the latch members 51 on the arms 49 engage within the apertures 70 in the side walls 62 of the extending portion 46. The axial passageway through the spring push member 34 aligns with the axial passageway 66 through the plug housing 22. The apertures 70 in the side walls 62 are larger than the latch members 51 so as to allow the latch members 51 to move therewithin thus allowing the spring push member 34 to slide relative to the plug housing 22. The spring push member 34 pushes on the spring 32, which in turn, pushes on the guide pin clip 30 and the ferrule member 28. This provides for a "floating" design of the ferrule member 28 and provides for a forward bias on the fiber optic cable when mounted in the connector 24 as described herein such that the optical fibers in the fiber optic cable will maintain a physical connection with the optical fibers in the other fiber optic cable (not shown) as is known in the art. While the coiled spring 32 is disclosed herein, it is to be understood that other forward biasing means can be provided.

The crimpable eyelet 36 is formed from a thin wall which has a first thin, cylindrical wall integrally formed at its forward end and a second thin, cylindrical wall integrally formed at its forward end. The first cylindrical wall has a larger diameter than the second cylindrical wall. An axial passageway 57 is formed through the eyelet 36 and has a first cylindrical portion within the first wall and a second cylindrical portion within the second wall. The first portion has a larger diameter than the second portion. The larger diameter first wall is crimped onto the cylindrical portion 45 of the spring push member 34 to maintain the engagement of the crimpable eyelet 36 with the spring push member 34.

The strain relief boot 38 is formed from a suitably compliant material which can be repeatedly bent in a limited bend radius so as to protect the optic fibers in the fiber optic cable mounted therein. Such a suitable material is thermoplastic elastomer. The boot 38 also provides strain relief for the fiber optic cable. The boot 38 is formed from a forward cylindrical portion 59 and a rearward frusto-conical portion 61. The portions 59 and 61 are preferably integrally formed with each other. An axial passageway 63 is formed through the strain relief boot 38. A forward portion of the axial passageway 63 is cylindrical, a middle portion of the axial passageway 63 is frusto-conical and a rearward portion of the axial passageway 63 is cylindrical. The crimpable eyelet 36 is mounted within the cylindrical portion 59 of the axial passageway 63 of the strain relief boot 38. The axial passageway 63 of the strain relief boot 38 conforms to the first and second cylindrical portions of the crimpable eyelet 36 so that a tight interconnection is provided between these components.

The crimpable eyelet 36 and the strain relief boot 38 are used to mount the fiber optic cable within the connector 24. When a fiber optic cable is mounted to the connector 24, the strength yarns in the fiber optic cable are compressively held between the crimpable eyelet 36 and the cylindrical portion 45 of the spring push member 34. The jacket is cut back to expose the strength yarns and the optical fibers and the end of the jacket is compressively held by the crimpable eyelet 36 at the rearward end thereof. The optical fibers are stripped of their coating and covering and are extended through the aligned axial passageways in the spring push member 34 and the plug housing 22, through the center of the U-shaped guide pin clip 30 and through the inner bores of the ferrule member 28 and out of the forward end 35 thereof for connection to another fiber optic cable in a known manner. It is to be understood that instead of providing a crimpable eyelet 26, a suitable adhesive can be used to join the strength yarns to the cylindrical portion 45 of the spring push member 34.

Now that the generalities of the plug housings 22, 22a, 22b 22c and 22d and the components of the connector 24 with which each of the plug housings 22, 22a, 22b 22c and 22d are intended to be utilized have been described, the specifics of each embodiment of the novel latch structure 20, 20a, 20b, 20c and 20d of each plug housing 22, 22a, 22b 22c and 22d, respectively, will be described. The latch structure 20, 20a, 20b, 20c and 20d can be integrally formed with the housing, or can be provided as a separate member made out of metal or plastic which is suitably mounted on the housing. Each latch structure 20, 20a, 20b, 20c and 20d is made out a material which has "memory", that is, it can be biased under the application of force and will return to its initial shape when the force is removed.

Attention is now directed to FIG. 3 which illustrates plug housing 22. As mentioned, the plug housing 22 shown in FIG. 3 is intended for use with connector 24 in accordance with a preferred embodiment of the present invention. As also mentioned, the connector 24 when plug housing 22 is included therein is configured to be engaged with an associated receptacle such as the receptacle 26 shown in FIG. 2.

The plug housing 22 includes a latch 20 which extends from a first end 80 to an opposite, second end 82 where both ends 80, 82 of the latch 20 are connected to the housing 22. The first end 80 of the latch 20 forms a key 84 for insertion into a keyway 86 of the receptacle 26 in order to assist in guiding the end 23 of the housing 22 into the receptacle 26. As shown, the key 84 is preferably rectangular in shape, however the key 84 may of course take other forms.

On the latch 20, adjacent the key 84, is a wedge portion 88. The wedge portion 88 is essentially a ramped portion of the latch 20 for engaging against corresponding wedging structure 90 in the receptacle 26 while the plug housing 22 is being inserted into the receptacle 26. The engagement of the wedge portion 88 of the latch 20 with the wedging structure 90 in the receptacle 26 provides that the plug housing 22 can be engaged in the receptacle 26 without having to physically touch any portion of the latch 20 while inserting the connector 24 in the receptacle 26 as will be described more fully later herein. As shown in FIG. 3, the wedge portion 88 of the latch 20 is preferably of the same width of the key 84, and extends from the key 84 of the latch 20 toward the second end 82 of the latch 20. The wedging structure 90 in the receptacle 26 is essentially a front portion 92 of an internal wall 94 of the receptacle 26 forming the keyway 86.

Figure 3A:
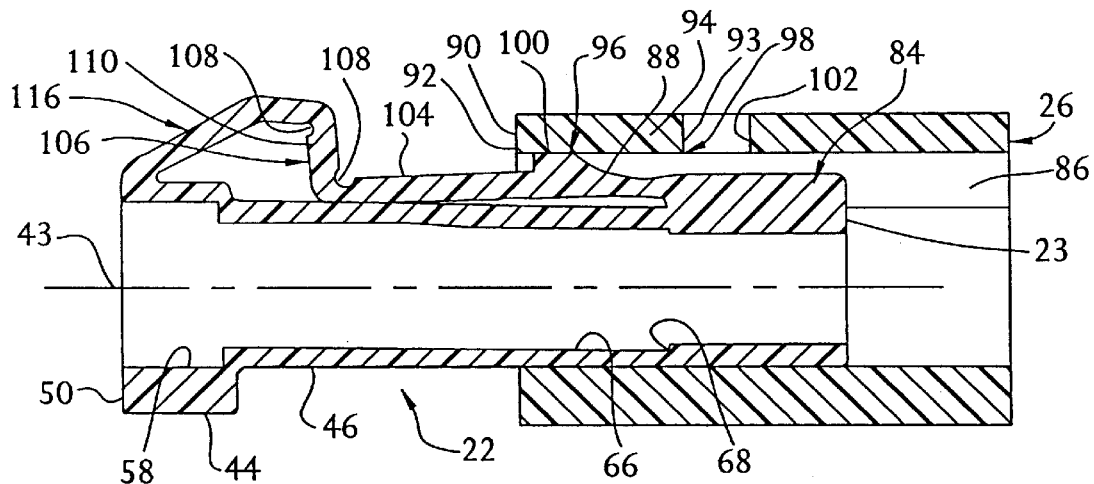
FIG. 3A is a cross-sectional view, taken along line A—A of FIG. 3, of the plug housing shown in FIG. 3, showing the plug housing being inserted into the receptacle shown in FIG. 2.
Figure 3B:
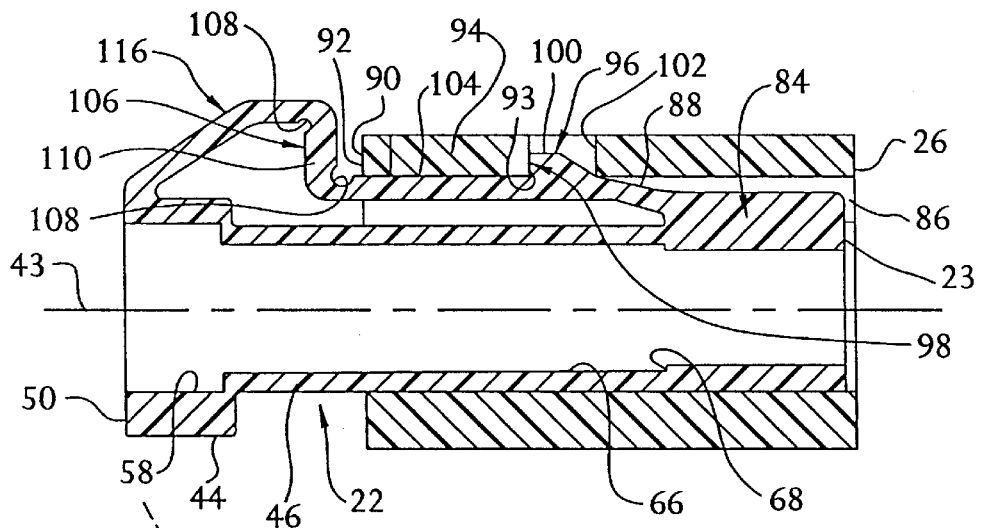
FIG. 3B is a cross-sectional view, taken along line A—A of FIG. 3, of the plug housing shown in FIG. 3, showing the plug housing having been fully inserted into the receptacle shown in FIG. 2.

Adjacent the wedge portion 88 of the latch 20 is retention or catch structure 96 for engaging with corresponding retention or catch structure 98 in the receptacle 26 upon the end 23 of the housing 22 being fully inserted therein, as shown in FIG. 3B. As shown, the catch structure 96 on the latch 20 is preferably an upwardly extending shoulder or protrusion 100 which engages in an aperture 102 in the receptacle 26. Alternatively, some type of enclosed recess within the receptacle 26 may be provided for receiving the protrusion 100 on the latch 20. The protrusion 100 engages with a stop in the receptacle 26 formed by a rear portion 93 of the internal wall 94, as will be described later herein. Instead of providing that the catch structure 96 is an extending protrusion 100, the catch structure 96 may consist of one or more catch ears on the latch 20 as is shown herein in relation to the other plug housings 22*a*, 22*b* 22*c* and 22*d*.

Adjacent the catch structure 96 on the latch 20 is a portion 104 which extends essentially from the catch structure 96 to a flexing portion 106 of the latch 20. As shown, preferably the extending portion 104 has essentially the same width of the catch structure 96, the wedge portion 88 and the key 84 of the latch 20. This provides not only that it is somewhat less expensive to provide the tool for injection molding the housing 22 and latch 20, but provides that there is no significantly reduced cross-sectional areas of the latch 20. Typically, a reduced cross-sectional area provides an area which is prone to failure during loading.

Figure 3C:
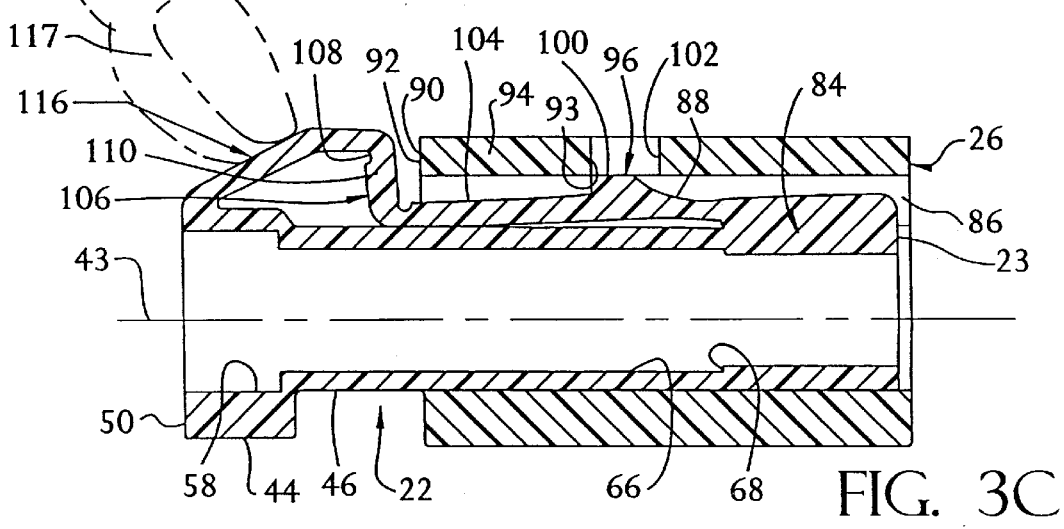
FIG. 3C is a cross-sectional view, taken along line A—A of FIG. 3, of the plug housing shown in FIG. 3, showing a latch thereof being deflected to remove the plug housing from the receptacle shown in FIG. 2 after the plug housing had been inserted therein as shown in FIG. 3B.

A flexing portion 106 of the latch 20 generally allows the latch 20 to move while the end 23 of the housing 22 is inserted into the receptacle 26 both so that the latch 20 may naturally progress to the position shown in FIG. 3A upon inserting the housing 22 into the receptacle 26, and so the latch 20 can be manually deflected to disengage the connector 24 from the receptacle 26 as shown in FIG. 3C. The flexing portion 106 may include a flexing joint 108 on each side of a wall 110, in which case the flexing joints 108 allow the latch 20 to move while the plug housing 22 is being engaged and disengaged from the receptacle 26 without the ends 80 and 82 of the latch 20, and especially the rear end 82 of the latch 20, experiencing excessive stresses. The flexing joints 108 may be essentially reduced cross-sectional areas of the latch 20, and more specifically, may be provided in the form of curved beams formed on the latch 20 and extending from one side 112 of the latch 20 to the other 114. As shown, the wall 110 of the flexing portion 106 is preferably generally perpendicular to the longitudinal axis 43 of the housing 22. As will be described later herein, the flexing joints 108 provide that the wall 110 of the flexing portion 106 can pivot allowing the latch 20 to deflect. Alternatively, the flexing portion 106 may comprise a thin flexing member such as a flexing wall which allows the latch 20 to move while the plug housing 22 is being engaged and disengaged from the receptacle 26. Generally, the flexing portion 106 of the latch 20 is adjacent an actuator portion 116 of the latch 20 and is between the actuator portion 116 and the extending portion 104 of the latch 20.

The actuator portion 116 of the latch 20 is adjacent the second end 82 of the latch 20 and is essentially between the second end 82 of the latch 20 and the flexing portion 106 thereof. As shown in FIG. 3C, the actuator portion 116 is an angled surface which is pressable thereon to cause the latch 20 to deflect in order to be able to disengage the plug housing 22 from the receptacle. Grip structure such as linear protrusions (not shown) may be provided on the actuator portion 116 in order to provide improved frictional contact between the thumb 117 of a user and the actuator portion 116. The pressing of the actuator portion 116 of the latch 20 will be described more fully later herein.

The insertion of the connector 24 into the receptacle 26, and more specifically, the insertion of the end 23 of the plug housing 22 of the connector 24 into the receptacle 26, will now be described. To insert the plug housing 22 into the receptacle 26, the housing 22 is held and the end 23 of the housing 22 is brought into initial communication with the receptacle 26 such that the key 84 at the end 80 of the latch 20 on the housing 22 is aligned with the keyway 86 in the receptacle 26. Then, the housing 22 is further pressed into the receptacle 26 such that the key 84 at the end 80 of the latch 20 rides into the keyway 86 in the receptacle 26 thereby guiding the housing 22 into the receptacle 26 in a generally linear path.

As the connector 24 is pushed into the receptacle 26, the wedge portion 88 on the latch 20 of the plug housing 22 engages or presses against the corresponding wedging structure 90 in the receptacle 26 and the plug housing 22 proceeds to the position shown in FIG. 3A as the plug housing 22 is pushed further into the receptacle 26. As mentioned, the wedging structure 90 in the receptacle 26 is essentially a front portion 92 of an internal wall 94 of the receptacle 26 which partially defines the keyway 86. A rear portion 93 of the internal wall 94 forms the catch structure 98 or stop of the receptacle 26 which eventually engages with the catch structure 96 on the latch 20 as the protrusion 100 engages in the aperture 102 in the receptacle 26. As the plug housing 22 is inserted into the housing 22, the wedge portion 88 of the latch 20 is pressed by the wedging structure 90 in the receptacle 26 such that the latch 20 is generally moved or deflected toward the housing 22, in a direction generally perpendicular to the longitudinal axis 43 of the housing 22. As the wedging structure 90 in the receptacle 26 presses on the wedge portion 88 of the latch 20 and the latch 20 is urged in a direction generally toward the housing 22, the flexing portion 106 of the latch 20 allows the latch 20 to deflect and move toward the housing 22 permitting movement of the latch 20 without there resulting excessive stresses at the ends 80, 82 of the latch 20. More specifically, the wall 110 of the flexing portion 106 pivots about the flexing joints 108 providing that the latch 20 moves towards the housing 22. The wedge portion 88 of the latch 20, at this time, also pivots toward the housing 20, about the intersection between the wedge portion 88 of the latch 20 and the key 84.

As the plug housing 22 is further pushed into the receptacle 26, the catch structure 96 on the latch 20 rides along the internal wall 94 of the receptacle 26 as shown in FIG. 3A until the catch structure 96 on the latch 20 crosses the catch structure 98 in the receptacle 26 as shown in FIG. 3B. At this time, the latch 20 moves in a direction generally away from the housing 22 as the catch structure 96 on the latch 20 engages in the aperture 102 in the receptacle 26 and engages the rear portion 93 of the internal wall 94 of the receptacle 26. When the connector 24 is fully inserted into the receptacle 26, the catch structure 96 on the latch 20 is engaged against the catch structure 98 in the receptacle 26 as shown in FIG. 3B. The rear portion 93 of the internal wall 94 of the receptacle functions as a stop, engaged against the protrusion 100 on the latch 20. This contactable engagement prevents the plug housing 22 or connector 24 from accidentally withdrawing from the receptacle 26 without pressing the actuator portion 116 of the latch 20 on the plug housing 22 as shown in FIG. 3C. When the plug housing 22 is fully inserted into the receptacle 26 such that the catch structure 96 on the latch 20 is engaged with the catch structure 98 in the receptacle 26 as shown in FIG. 3B, the optical fiber in the housing 22 is terminated or in operable communication with another corresponding optical fiber in the receptacle 26. Preferably, the two optical fibers are aligned with sufficient precision and accuracy that no significant amount of data is lost at the point of connection or termination.

Also, preferably when the plug housing 22 is fully inserted into the receptacle 26 as shown in FIG. 3B, the latch 20 on the plug housing 22 is essentially in the same state as when the plug housing 22 is disengaged from the receptacle 26 as shown in FIG. 3. In other words, the latch 20 is not deflected when the plug housing 22 is fully inserted into the receptacle 26 as shown in FIG. 3B. This is an advantage because deflection of the latch 20 causes internal stresses within the latch 20. By providing that the latch 20 becomes deflected only when the connector 24 or plug housing 22 is being inserted and removed from the receptacle, as is shown in FIGS. 3A and 3C, respectively, and that the latch 20 otherwise is undeflected, the latch 20 is subjected to stresses at only very short time periods. This is in sharp contrast to providing that the latch 20 be partially deflected when the plug housing 22 is fully engaged with the receptacle 26. In such a case, the latch 20 would experience stresses for extended periods of time. Nevertheless, the present invention is, of course, not limited to latches which re-form their natural state when fully engaged with an associated receptacle.

To remove the plug housing 22 from the receptacle 26, one presses a thumb 117 on the actuator portion 116 of the latch 20 as shown in FIG. 3C. This pressing causes the wall 110 of the flexing portion 106 of the latch 20 to pivot about the flexing joints 108 thus providing that the latch 20 deflects, moving in a direction generally towards the housing 22 and perpendicular to the longitudinal axis 43 of the housing 22. Alternatively, if a flexible member, such as a flexible wall, is provided, the pressing will cause the flexible member to flex thereby allowing the latch 20 to move towards the housing 22. At this time, the wedge portion 88 of the latch 20 also pivots towards the housing 22, about the intersection between the key 84 and the wedge portion 88 of the latch 20. The deflection or movement of the latch 20 causes the protrusion 100 on the latch 20 to withdraw from the aperture 102 in the receptacle 26 and the catch structure 96 on the latch 20 to move out of catchable engagement with the catch structure 98 in the receptacle 26. Then, the connector 24 can be readily withdrawn from the receptacle 26. As the connector 24 is being withdrawn from the receptacle 26, one may release the actuator portion 116 of the latch 20 on the plug housing 24 causing the protrusion 100 on the latch 20 to contact and ride along the internal wall 94 of the receptacle 26, as shown in FIG. 3A, as the plug housing 22 becomes fully removed from the receptacle 26. As shown in FIG. 3, when the plug housing 22 is fully removed from the receptacle 26 and the actuator portion 116 of the latch 20 is not pressed upon, the latch 20 is undeflected and re-forms its "natural" state. As mentioned, the undeflected, natural state of the latch 20 occurs both when the plug housing 22 is fully disengaged from the receptacle 26, as shown in FIG. 3, and when the plug housing 22 is fully engaged with the receptacle 26, as shown in FIG. 3B.

As mentioned, the latch 20 on the plug housing 22 is connected to the housing 22 at both ends 80 and 82 of the latch 20. This provides that loose wires and/or optical fibers cannot ride under the latch 20 during engagement or disengagement of the connector 24 with an associated receptacle 26. Additionally, the latch 20 includes a flexing portion 106, and more specifically, a pivoting wall 110, and this provides that the latch 20 is durable and can handle repeated engagements and disengagements with the associated receptacle 26 without breaking. Still further, the connector 24 is relatively inexpensive to produce and consists of relatively few parts.

Figure 4:
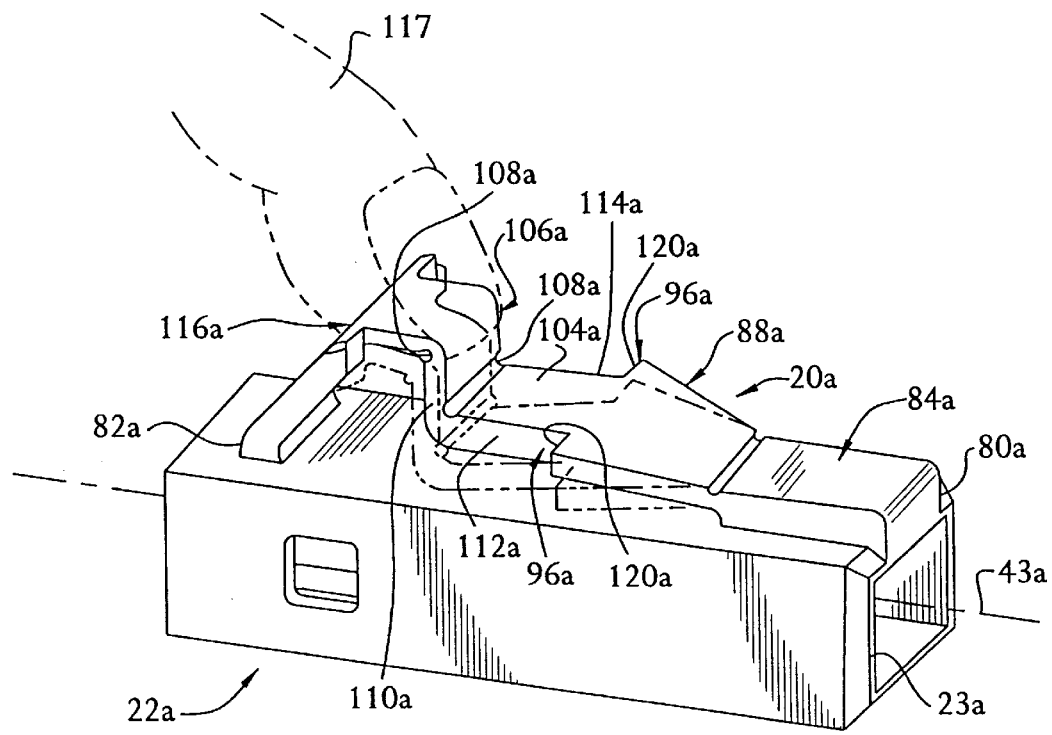
FIG. 4 is a perspective view of a plug housing in accordance with another embodiment of the present invention illustrating, in phantom, movement of a latch thereof.

The plug housing 22a shown in FIG. 4 will now be described. As mentioned, unlike plug housing 22, each of the plug housings 22a, 22b 22c and 22d is configured to be engaged with a receptacle which is similar to a standard RJ-type receptacle but smaller in dimension. Therefore, the receptacle is not shown in any of the drawings, and it is assumed that one having ordinary skill in the art would readily know, by viewing the drawings of each of the plug housings 22a, 22b 22c and 22d and by reading the detailed description of each of these plug housings 22a, 22b 22c and 22d, the appearance and functioning of the receptacle with which each of the plug housings 22a, 22b 22c and 22d is configured for use. However, reference can be made to U.S. Pat. No. 5,562,475 which depicts a standard RJ-type receptacle, and the disclosure of that patent is hereby incorporated herein by reference.

The latch 20a of plug housing 22a extends from a first end 80a to an opposite, second end 82a where, like plug housing 22 shown in FIG. 3, both ends 80a, 82a of the latch 20a are connected to the housing 22a. Plug housing 22a also includes, on the latch 20a, a key 84a, a wedge portion 88a, catch structure 96a, an extending portion 104a, a flexing portion 106a, and an actuator portion 116a. The catch structure 96a on the latch 20a of plug housing 22a is shown as consisting of two catch ears 120a with the extending portion 104a of the latch 20a therebetween. However, the catch structure 96a may instead consist of one or more upwardly extending shoulders or protrusions as is on the latch 20 of the plug housing 22 already described hereinabove. Like the flexing portion 106 of the latch 20 of plug housing 22, the flexing portion 106a of the latch 20a of plug housing 22a consists of two flexing joints 108a, one on each side of a pivoting wall 110a. Each flexing joint 108a is a curved notch running from one side 112a of the latch 20a to the other side 114a thereof. As shown, preferably the extending portion 104a and flexing portion 106a are of substantially the same width. Instead of providing a pivoting wall 110a, a flexible member such as a wall can be provided to provide that the latch 20a can deflect as will be described.

In much the same manner as previously described in relation to plug housing 22, when the plug housing 22a is initially inserted into the receptacle, the front portion 23a of the plug housing 22a is aligned with the receptacle such that the key 84a on the latch 20a is aligned with a corresponding keyway in the receptacle, and as the plug housing 22a is pushed further into the receptacle, the wedge portion 88a of the latch 20a is forced downward by the receptacle. As one having ordinary skill in the art would recognize, this is consistent with the general operation of a standard RJ-type receptacle. As the plug housing 22a is being inserted into the receptacle, the latch 20a need not be manipulated to cause the catch structure 96a on the latch 20a to eventually engage the corresponding catch structure in the receptacle because the engagement between the wedge portion 88a on the latch 20*a* and the wedging structure of the receptacle causes the required deflection of the latch 20*a* for the housing to adequately travel into the receptacle. As the latch 20*a* deflects downward toward the housing 22*a*, in a direction generally perpendicular to a longitudinal axis 43*a* of the housing 22*a*, the pivoting wall 110*a* of the flexing portion 106*a* of the latch 20*a* pivots about both flexing joints 108*a* and the wedge portion 88*a* of the latch 20*a* pivots about the intersection between the wedge portion 88*a* and the key 84*a* of the latch 20*a*. This movement of the latch 20*a* is similar to the movement of the latch 20 which is generally illustrated in the progression from real to phantom lines in FIG. 4.

As the plug housing 22*a* is further pushed into the receptacle, the catch structure 96*a* on the latch 20*a* catches in the receptacle. At this time, the latch 20*a* moves in a direction generally away from the housing 22*a*. When the plug housing 22*a* is fully inserted into the receptacle, the catch structure 96*a* on the latch 20*a* is engaged against corresponding catch structure 96*a* in the receptacle as one having ordinary skill in the art would readily understand in connection with a standard RJ-type receptacle. This contactable engagement prevents the plug housing 22*a* from accidentally withdrawing from the receptacle. When the plug housing 22*a* is fully inserted into the receptacle such that the catch structure 96*a* on the latch 20*a* is contactably engaged within the receptacle, the optical fiber in the housing 22*a* is terminated or in operable communication with another corresponding optical fiber in the receptacle.

Also, as in plug housing 22, preferably when the plug housing 22*a* is fully inserted into the receptacle, the latch 20*a* on the plug housing 22*a* is essentially in the same state as when the plug housing 22*a* is disengaged from the receptacle. In other words, the latch 20*a* is not deflected when the plug housing 22*a* is fully inserted into the receptacle.

To remove the plug housing 22*a* from the receptacle, one presses on the actuator portion 116*a* of the latch 20*a* with one=s thumb 117. This pressing on the actuator portion 116*a* causes the wall 110*a* of the flexing portion 106*a* of the latch 20*a* to pivot about the flexing joints 108*a* and causes the wedge portion 88*a* of the latch 20*a* to pivot about the point of intersection between the wedge portion 88*a* and the key 84*a* thus providing that the latch 20*a* deflects as generally illustrated with phantom lines in FIG. 4. As shown, the latch 20*a* moves in a direction generally towards the housing 22*a* and perpendicular to the longitudinal axis 43*a* of the housing 22*a*. This movement of the latch 20*a* causes the catch structure 96*a* on the latch 20*a* to move out of catchable engagement with the corresponding catch structure in the receptacle so that the plug housing 22*a* can be readily withdrawn from the receptacle. As the plug housing 22*a* is being withdrawn from the receptacle, after the catch ears 120*a* have disengaged and moved slightly away from the corresponding catch structure in the receptacle, one may release the actuator portion 116*a* of the latch and keep withdrawing the plug housing 22*a* from the receptacle until the plug housing 22*a* is fully disengaged therefrom.

Much like plug housing 22, when plug housing 22*a* is fully removed from the receptacle and the actuator portion 116*a* of the latch 20*a* is not pressed upon, the latch 20*a* is generally undeflected and re-forms its natural state. As mentioned above in relation to plug housing 22, this provides certain important advantages. Additionally, as mentioned, the latch 20*a* of plug housing 22*a* is connected to the housing 22*a* at both ends. This provides that loose wires and/or optical fibers cannot ride under the latch 20*a* during engagement or disengagement of the plug housing 22*a* with an associated receptacle. Additionally, the latch 20*a* includes a flexing portion 106*a*, and more specifically, a pivoting wall 110*a* and a pair of flexing joints 108*a*. This provides that the latch 20*a* is durable and can handle many iterations of engagement and disengagement with an associated receptacle without breaking. Instead of providing a pivoting wall 110*a*, a flexible wall may be provided.

Figure 5:
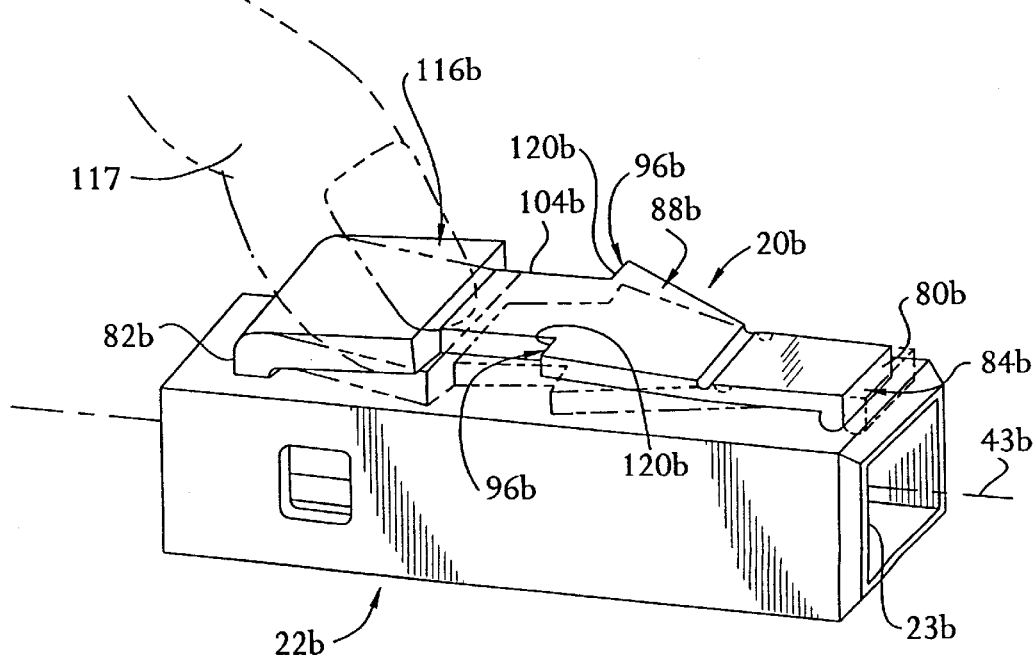
FIG. 5 is a perspective view of a plug housing in accordance with still another embodiment of the present invention illustrating, in phantom, movement of a latch thereof.

The plug housing 22*b* shown in FIG. 5 will now be described. The plug housing 22*b* includes a latch 20*b* where, unlike the latches of plug housings 22 and 22*a* shown in FIG. 3 and 4, respectively, only the second end 82*b* of the latch of plug housing 22*b* is connected to the housing 22*b*. The other end 80*b* of the latch 20*b*, at the front portion 23*b* of the housing 22*b* is simply supported by the housing 22*b*. Preferably, the end 80*b* is in contact with the housing 22*b* when the plug housing 22*b* is in its natural state, fully disengaged from the receptacle. This would provide that no loose wires and/or optical fibers can ride under the latch 20*b* while the latch 20*b* is being engaged with a receptacle. However, the end 80*b* of the latch 20*b* can be, in fact, slightly spaced away from the housing 22*b* when the housing 22*b* is disengaged from the receptacle such that the end 80*b* of the latch 20*b* only contacts the housing 22*b* when the latch 20*b* deflects, as will be described more fully later herein.

Like the other plug housings described, plug housing 22*b* includes a key 84*b*, a wedge portion 88*b*, catch structure 96*b*, an extending portion 104*b*, and an actuator portion 116*b*. Like plug housing 22*a*, the catch structure 96*b* on the latch 20*b* of plug housing 22*b* is shown as consisting of two catch ears 120*b* separated by the extending portion 104*b*. However, the catch structure 96*b* may, of course, instead consist of one or more upwardly extending shoulders or protrusions as shown in relation to plug housing 22. As shown, the width of the extending portion 104*b* is somewhat less than that of the actuator portion 116*b*.

When the plug housing 22*b* is initially inserted into the receptacle, the front portion 23*b* of the housing 22*b* is aligned with the receptacle such that the key 84*b* on the latch 20*b* is aligned with a corresponding keyway in the receptacle. As the housing 22*b* is pushed further into the receptacle, the wedge portion 88*b* of the latch 20*b* is forced downward by the receptacle. Generally, this is consistent both with all the other housings described herein and with the general operation of a standard RJ-type receptacle as one having ordinary skill in the art would readily understand. As the housing 22*b* is being inserted into the receptacle, the latch 20*b* need not be manipulated to cause the catch structure 96*b* on the latch 20*b* to eventually engage the corresponding catch structure 96*b* in the receptacle because the engagement between the wedge portion 88*b* on the latch 20*b* and the wedging structure of the receptacle causes the latch 20*b* to deflect. This deflection or movement of the latch 20*b* and pivoting of the extending portion 104*b* is generally illustrated by the progression of the latch 20*b* depicted in real lines to the latch 20*b* depicted with phantom lines in FIG. 5. As shown, as the latch 20*b* deflects generally towards the housing 22*b* the end 80*b* of the latch 20*b* contacts and "plays" or slides along the housing 22*b*. The fact that the end 80*b* of the latch 20*b* is simply supported on the housing 22*b* allows axial movement of the latch 20*b* during deflection. Additionally, the contact of the end 80*b* of the latch 20*b* with the housing 22*b* during deflection provides that the housing 22*b* assists in deflecting the latch 20*b*.

As the housing 22*b* is inserted further into the receptacle such that the housing 22*b* becomes fully inserted therein thereby causing the optical fiber therein to terminate with a corresponding optical fiber in the receptacle, the catch ears 120b on the latch 20b come into contactable engagement with catch structure in the receptacle as would be readily understood by one having ordinary skill in the art. When the catch ears 120b on the latch 20b engage the catch structure in the receptacle, the latch 20b re-forms to its natural, undeflected state.

To remove the housing 22b from the receptacle, one presses on the actuator portion 116b of the latch using a thumb 117. This pressing on the actuator portion 116b causes the latch 20b to deflect as illustrated with phantom lines in FIG. 5. As shown, the latch 20b moves in a direction generally towards the housing 22b and perpendicular to the longitudinal axis 43b of the housing 22b. This movement of the latch 20b causes the catch structure 96b on the latch 20b to move out of catchable engagement with the catch structure in the receptacle so that the housing 22b can be readily withdrawn from the receptacle. As the actuator portion 116b is pressed, the end 80b of the latch 20b contacts and rides along the housing 22b as described above. As mentioned, this contact of the end 80b of the latch 20b with the housing 22b and the movement of the end 80b of the latch 20b along the housing 22b provides that the housing 22b assists in deflecting the latch 20b.

As the housing 22b is being withdrawn from the receptacle, after the catch ears 120b have disengaged and moved slightly away from the catch structure in the receptacle, one may release the actuator portion 116b of the latch 20b and keep withdrawing the housing 22b from the receptacle. Housing 22b is like the others plug housings described herein in that when it is fully removed from the receptacle and the actuator portion 116b of the latch 20b is not pressed upon, the latch 20b is undeflected and re-forms to its natural state.

Additionally, as mentioned, the latch 20b of housing 22b is connected to the housing 22b at one end 82b and the other end 80b of the latch 20b, when the latch 20b is in its natural state, is preferably in contact with or is at least in close proximity to the housing 22b. This provides that loose wires and/or optical fibers do not tend to ride under the latch 20b during engagement or disengagement of the housing 22b with an associated receptacle. The latch 20b is durable and can handle several iterations of engagement and disengagement with an associated receptacle without breaking.

Figure 6:
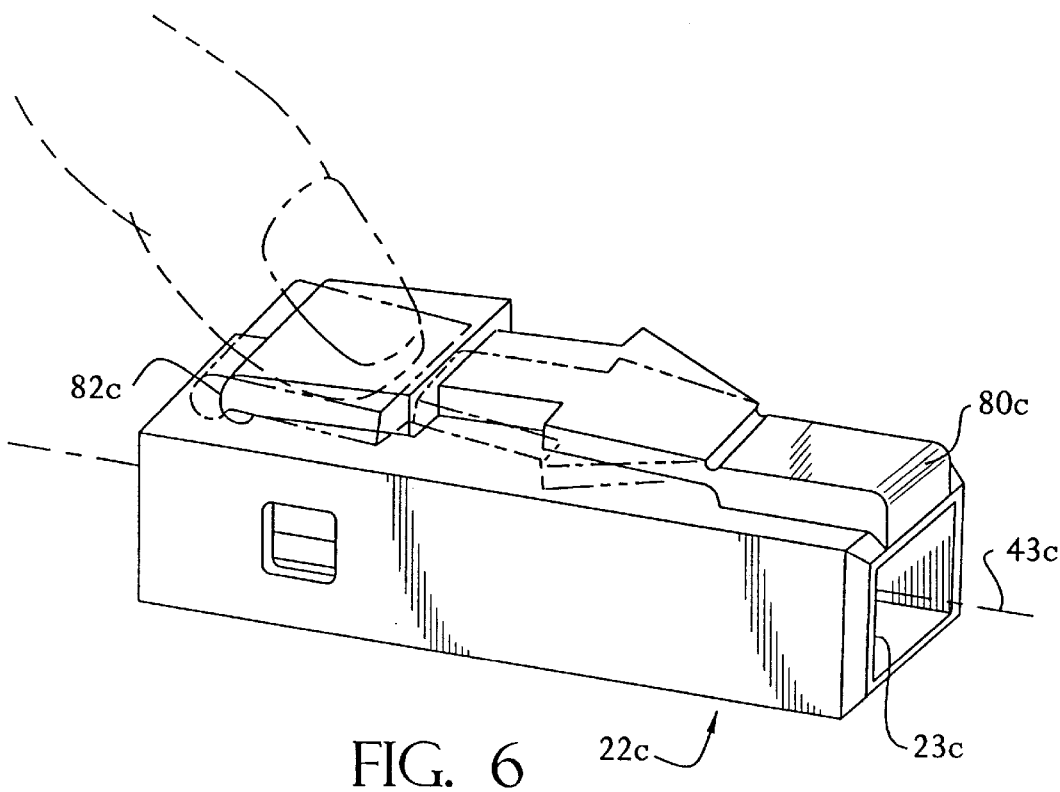
FIG. 6 is a perspective view of a plug housing in accordance with still yet another embodiment of the present invention illustrating, in phantom, movement of a latch thereof.

The plug housing 22c shown in FIG. 6 is very much like plug housing 22b and has a similarly shaped end portion 23c, but instead of providing that the first end 80c of the latch is simply supported by the housing 22c and the second end 82c is connected or fixed to the housing 22c the housing 22c provides the opposite, that is that the first end 80c of latch 20c is connected to the housing 22c and the second end 82c of the latch 20c is simply supported by the housing 22c. Preferably, the end 82c is in contact with the housing 22c when the housing 22c is in its natural state, fully disengaged from the receptacle as in the other embodiments already described. However, the end 82c of latch 20c, like end 80b of latch 20b, can be, in fact, slightly spaced away from the housing 22c when the housing 22c is disengaged from the receptacle such that the end 82c of the latch 20c only contacts the housing 22c when the latch 20c deflects.

As shown by the progression of real lines to phantom lines in FIG. 6, deflection of the latch 20c is towards the housing 22c and generally perpendicular to a longitudinal axis 43c thereof and is very similar to the deflection of the latch 20b of housing 22b but with the opposite end thereof "playing", or contactably sliding, along the housing 22c. As mentioned with respect to housing 22b this slidable contact with the housing 22c and movement of the end 82c of the latch 20c along the housing 22c provides that the housing 22c assists in deflecting the latch 20c.

Because the latch 20c of housing 22c operates in much the same manner as the latch 20b of housing 22b and has essentially the same components thereof, a detailed discussion thereof is omitted with the understanding that one may review the discussion of the latch 20b of housing 22b to obtain an understanding thereof.

Figure 7:
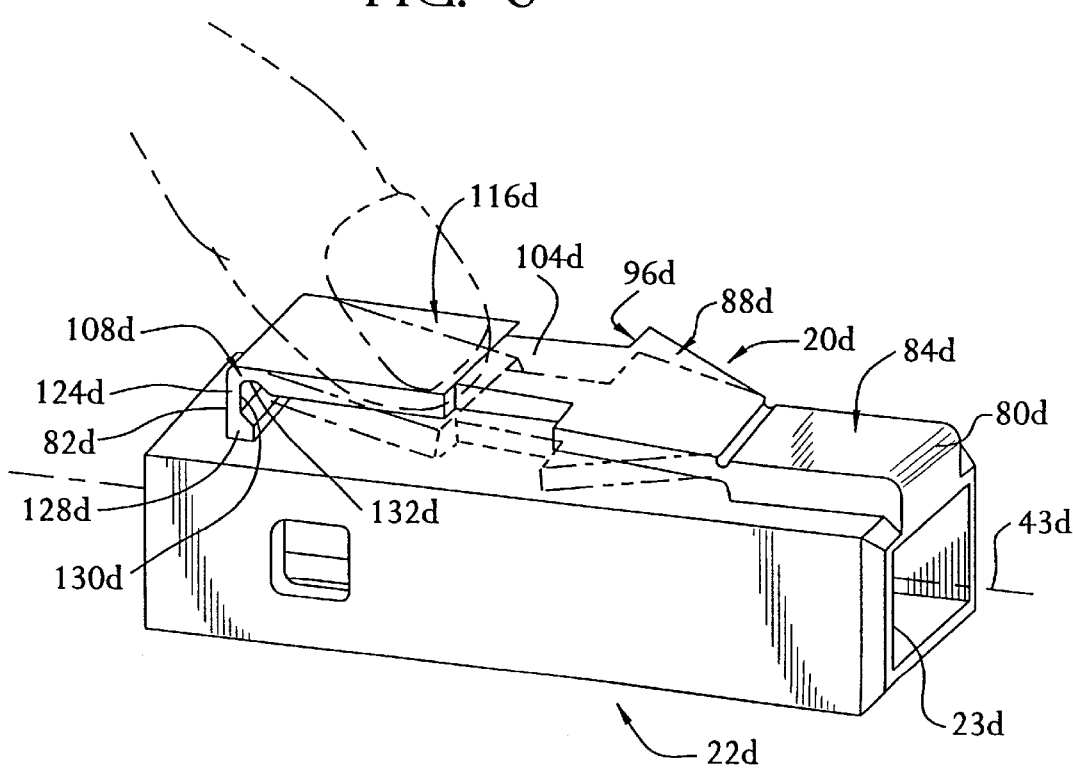
FIG. 7 is a perspective view of a plug housing in accordance with still yet another embodiment of the present invention illustrating, in phantom, movement of a latch thereof.

The plug housing 22d shown in FIG. 7 includes a latch 20d having both ends 80d and 82d thereof attached to the housing 22d. The latch 20d has essentially the same key 84d, wedge portion 88d, catch structure 96d, extending portion 104d and actuator portion 116d as that of housing 22c. However, housing 22d provides a flexing portion 108d generally at the end 82d of the latch 20d in the form of a reduced cross-sectional portion. More specifically, a beam 124d is provided at the end 82d of the latch 20d, and the beam 124d is connected at one end to the housing 22d and at the other end to the actuator portion 116d. The beam 124d is generally perpendicular to the longitudinal axis 43d of the housing 22d. An increased cross-sectional area portion 128d of the beam 124d is at the end of the beam 124d which is attached to the housing 22d, and a reduced cross-sectional area portion 130d of the beam 124d is connected to the actuator portion 116d of the latch 20d. As shown, the actuator portion 116d also includes a reduced cross-sectional area portion 132d which is connected to the reduced cross-sectional area portion 130d of the beam 124d.

The increased cross-sectional area portion 128d of the beam 124d provides for increased surface area at the point of attachment of the end 82d of the latch 20d to the housing 22d. This provides that the point of attachment is more capable of handling the loading during deflection of the latch 20d without breakage from the housing 22d.

The reduced cross-sectional area portions 130d and 132d of the beam 124d and actuator portion 116d, respectively, provide essentially a flexing joint 108d which allows the latch 20d to deflect generally toward the housing 22d during engagement and disengagement of the housing 22d with an associated receptacle. The deflection of the latch 20d while the housing 22d is being engaged with and disengaged from the receptacle is illustrated with phantom lines in FIG. 7. Like the other embodiments of the invention previously described, the housing 22d provides that the latch 20d thereof is in its natural, generally un-deflected, state both when the housing 22d is fully engaged with the associated receptacle and when the housing 22d is fully disengaged therefrom.

Each of the plug housings 22, 22a, 22b 22c, 22d described above provides that loose wires and/or optical fibers cannot readily ride under the latch thereof during engagement or disengagement of the respective connector with an associated receptacle. Additionally, each latch includes either a flexing portion or a sliding portion which provides that the latch is durable. Still further, each of the plug housings is relatively inexpensive to produce.

While specific embodiments of the present invention are shown and described, it is envisioned that those skilled in the art may devise various modifications of the present invention without departing from the spirit and the scope of the appended claims.

The invention claimed is:

1. A connector for terminating a member positioned therein, said connector comprising:

a housing having a longitudinal axis and an end configured for insertion into an associated receptacle to terminate said member, said member disposed in said housing and positioned for termination upon said housing being inserted into said associated receptacle; and a latch on said housing for securing said housing in said associated receptacle, said latch having a first end and a second end opposite said first end, wherein each of said first end and said second end of said latch is either connected to said housing or simply supported by said housing, and said latch including a flexing portion generally perpendicular to said longitudinal axis of said housing.

2. The connector defined in claim 1, wherein said first end of said latch is adjacent said end of said housing and inserts into said associated receptacle therewith, said latch including an actuator portion between said first end and said second end of said latch, said actuator portion of said latch pressable thereon to disengage said housing from said receptacle after said housing has been engaged therewith, wherein said first end of said latch is connected to said housing and wherein said second end of said latch slidably contacts said housing during pressing of said actuator portion of said latch to disengage said housing from said receptacle.

3. The connector defined in claim 2, said latch including catch structure between said actuator portion of said latch and said first end of said latch, said catch structure of said latch engaging with corresponding catch structure in said associated receptacle causing said housing to become secured in said associated receptacle.

4. The connector defined in claim 3, said latch including a wedge portion between said first end of said latch and said catch structure on said latch, said wedge portion of said latch engageable against corresponding wedging structure in said associated receptacle when said housing is inserted into said associated receptacle, said latch being urged in a direction generally perpendicular to said longitudinal axis of said housing so that said catch structure on said latch can engage with said corresponding catch structure in said associated receptacle upon said housing being further inserted into said associated receptacle.

5. The connector defined in claim 4, said first end of said latch defining a key for insertion in a keyway in said associated receptacle.

6. The connector defined in claim 1, wherein said first end of said latch is adjacent said end of said housing, is slidably contactable with said housing and inserts into said associated receptacle with said end of said housing, said latch including an actuator portion pressable thereon to disengage said housing from said receptacle after said housing has been engaged therewith, said second end of said latch connected to said housing.

7. The connector defined in claim 6, wherein said first end of said latch slidably contacts said housing during pressing of said actuator portion of said latch to disengage said housing from said associated receptacle.

8. The connector defined in claim 7, said latch including catch structure between said actuator portion of said latch and said first end of said latch, said catch structure of said latch engaging with corresponding catch structure in said associated receptacle causing said housing to become secured in said associated receptacle.

9. The connector defined in claim 8, said latch including a wedge portion between said first end of said latch and said catch structure of said latch, said wedge portion of said latch engageable against corresponding wedging structure in said associated receptacle when said housing is inserted into said associated receptacle, said latch being urged in a direction generally perpendicular to said longitudinal axis of said housing so that said catch structure on said latch can engage with said corresponding catch structure in said associated receptacle upon said housing being further inserted into said housing.

10. The connector defined in claim 1, wherein both ends of said latch are connected to said housing.

11. The connector defined in claim 10, said housing having a longitudinal axis, said latch including a flexing portion including a beam generally perpendicular to said longitudinal axis of said housing and connected to said housing at said second end of said latch, said first end of said latch adjacent said end of said housing for insertion into said associated receptacle.

12. The connector defined in claim 11, said first end of said latch defining a key for insertion in a keyway in said associated receptacle.

13. The connector defined in claim 1, said latch including an actuator portion between said flexing portion of said latch and said second end of said latch, said actuator portion of said latch pressable thereon to disengage said housing from said receptacle after said housing has been engaged therewith, said latch including catch structure between said flexing portion of said latch and said first end of said latch, said catch structure of said latch engaging with corresponding catch structure in said associated receptacle causing said housing to become secured in said associated receptacle.

14. The connector defined in claim 13, said latch including a wedge portion between said first end of said latch and said actuator portion of said latch, said wedge portion of said latch engageable against corresponding wedging structure in said associated receptacle when said housing is inserted into said associated receptacle, said latch being urged in a direction generally perpendicular to said longitudinal axis of said housing so that said catch structure on said latch can engage with said corresponding catch structure in said associated receptacle upon said housing being further inserted into said associated receptacle.

15. The connector defined in claim 1, said latch including an actuator portion between said flexing portion of said latch and said second end of said latch, said actuator portion of said latch pressable thereon to disengage said housing from said receptacle after said housing has been engaged therewith.

16. The connector defined in claim 1, said latch including catch structure between said flexing portion of said latch and said first end of said latch, said catch structure of said latch engaging with corresponding catch structure in said associated receptacle causing said housing to become secured in said associated receptacle.

17. The connector defined in claim 1, wherein said latch is generally undeflected both when the connector is fully engaged with and fully disengaged from the associated receptacle.

18. A connector for terminating a member positioned therein, said connector comprising:

a housing defining a cavity and having an end configured for insertion into an associated receptacle to terminate said member, said member disposed in said cavity of said housing and positioned for termination upon said housing being inserted into said associated receptacle, said housing having a longitudinal axis; and a latch on said housing for securing said housing in said associated receptacle, said latch having a first end and a second end opposite said first end, wherein each of said first end and said second end of said latch is connected to said housing, said latch including a flexing portion generally perpendicular to said longitudinal axis of said housing, said latch including catch structure thereon between said flexing portion of said latch and said first end of said latch, said catch structure of said latch engaging with corresponding catch structure in said associated receptacle causing said housing to become secured in said associated receptacle, said latch including an actuator portion between said flexing portion of said latch and said second end of said latch, said actuator portion of said latch pressable thereon to disengage said housing from said receptacle after said housing has been engaged therewith, said latch including a wedge portion between said first end of said latch and said catch structure of said latch, said wedge portion of said latch engageable against corresponding wedging structure in said associated receptacle when said housing is inserted into said associated receptacle, said latch being urged in a direction generally perpendicular to said longitudinal axis of said housing so that said catch structure on said latch can engage with said corresponding catch structure in said associated receptacle upon said housing being inserted into said associated receptacle, wherein said first end of said latch is adjacent said end of said housing and inserts into said associated receptacle therewith, said first end of said latch defining a key for insertion in a keyway in said associated receptacle.

* * * * *